# 2,891,895

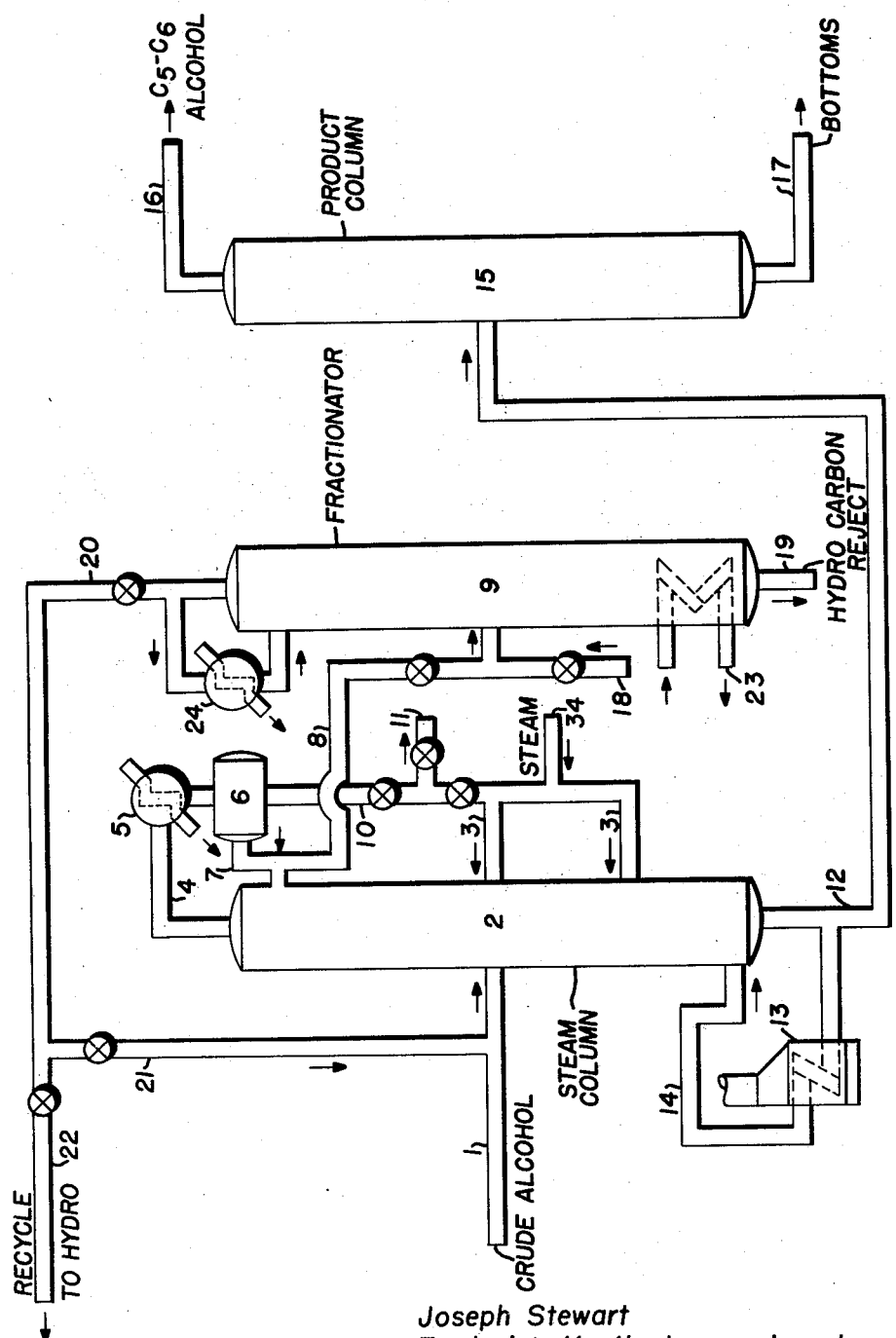
Joseph Stewart
Frederick Knoth Jr.
Paul E. Neiman
Inventors
By *Henry Berk* Attorney

PROCESS FOR PURIFYING OXY AMYL ALCOHOLS

Joseph Stewart, Cranford, N.J., Frederick Knoth, Jr., Palembang, Sumatra, Indonesia, and Paul E. Neiman, Summit, N.J., assignors to Esso Research and Engineering Company, a corporation of Delaware Application January 26, 1954, Serial No. 406,308

5 Claims. (Cl. 202—51)

This invention relates to a process for purifying amyl alcohols as made by the Oxo process.

It is concerned with a sequence of distillations including steam distillation for separation of amyl alcohols and a high pressure distillation for separating the hydrocarbon impurities from the steam distillation overhead stream to achieve a high recovery of the alcohols essentially free of water, hydrocarbon and carbonyl impurities.

In the manufacture of amyl alcohols from butenes by the known Oxo process it has been found that the alcohols tend to be contaminated by certain hydrocarbons typified by decenes (boiling points 300° to 340° F.) as well as some lower hydrocarbons. Some overhydrogenation of aldolization products present in the Oxo aldehydes is considered to form these hydrocarbons. Such relatively higher boiling hydrocarbons azeotrope with the lower $C_5$ alcohols and thereby make their separation from the alcohols impossible by conventional atmospheric distillation. The separation of hydrocarbons from the amyl alcohols consisting largely of a mixture of isomers has been found to require specific handling under critical conditions.

One kind of process for completely eliminating the hydrocarbon impurities with some other organic impurities from these alcohols involves the use of water and steam preferably under elevated pressures for distilling the impurities overhead with a minimum amount of the alcohol. In this distillation procedure the overhead distillate separates in a water layer condensate and an upper oil layer condensate which contains substantial amounts of the alcohol. By further processing most of this alcohol is recovered. It is with regard to the ultimate high overall recovery of the alcohols from the feed that the present invention is concerned.

The present process will be explained with reference to the attached drawing which shows a simplified flow plan.

When the crude $C_5$ alcohols are contaminated with from about 1 to 12% of hydrocarbons of the type described and small quantities of aldehydes, this crude mixture may be fed by line 1 into an intermediate part of the steam distillation column 2. A suitable concentration of water is maintained in the internal reflux flowing down through column 2 below the feed inlet. The amount of water in this internal reflux is adjusted by adding water or steam from injection line 3 and also controlling the pressure and temperatures in column 2. It is important to have present only sufficient amount of water in the liquid phase on the plates in the tower so as to form a homogeneous solution with the alcohols and thus saturate the alcohol reflux with 30 mole percent water or more without permitting excess water to flow down toward the bottom of column 2 where it is desired to have the alcohol completely stripped of water. Furthermore, under certain temperature conditions excess water will form a separate liquid phase which is undesirable since it seriously reduces plate efficiency. With these controls, $C_{10}$ and lower hydrocarbon contaminants are distilled overhead with a relatively small amount of the alcohol and with a large proportion of steam, the steam amounting to from 60 to about 80 mole percent of the vapor taken overhead in column 2 by line 4 to cooling condenser 5, thence to receiver 6.

In the receiver 6, the condensates separate into an upper hydrocarbon oil-rich layer and a lower aqueous layer. A portion of the hydrocarbon-rich layer may be refluxed back to the upper part of column 2 by line 7. A remaining portion of the hydrocarbon-rich oil layer is passed by line 8 to a fractionating column 9.

A portion of the water-rich layer may be refluxed into column 2, through line 10, a remaining portion of the water distillate may be discarded through line 11. Some of the $C_5$ alcohols and aldehyde impurities will be present in the water layer. If the aldehyde content of this recycle water stream is high enough to adversely affect the final alcohol quality, the entire water layer can be discarded and fresh water or steam added to column 2 through line 3. Fresh water or steam may be added from line 34 to line 3.

Column 2 is equipped at its bottom with a withdrawal line 12 and a reboiler 13. A portion of the bottoms alcohol product substantially free of water but containing higher boiling impurities is passed through the reboiler 13 and returned by line 14 to column 2 for providing the necessary heat. In general, the temperature at the bottom part of column 2 has to be maintained sufficiently high, e.g. about 400 to 450° F., to insure complete removal of the water vapor, hydrocarbon and lower boiling carbonyl contaminants. The bottoms product of column 2 is passed by line 12 into column 15 for fractional distillation of the alcohol product overhead through line 16 and removal of substantially higher boiling organic impurities from the bottom of column 15 by line 17. Conditions of operation which are suitable in column 15 are represented by a bottoms temperature of 410° F. and a top temperature of 302° F. under a pressure of 10 p.s.i.g. in distilling dry and hydrocarbon-free amyl alcohols overhead from column 15. These temperatures will vary with the column pressure employed.

The operation of intermediate column 9 is of particular significance for the present invention. Column 9 is fed with the hydrocarbon-rich mixture of $C_5$ alcohols to be purified and contains substantial amounts of the hydrocarbon contaminants and some aldehyde contaminants. Such a mixture is obtained as the upper oil layer from the steam distillation column 2 as mentioned. It may also be fed independently or simultaneously with such a feed from line 18. The purpose of column 9 is to reject the hydrocarbon impurities as bottoms products to be removed by line 19 and to distill an overhead product containing the alcohol and aldehyde with a favorably diminished amount of hydrocarbon. This overhead is taken from column 9 through line 20 and recycled to the steam distillation tower 2. The overhead stream from column 9 through line 20 may be split to return only a portion thereof by line 22 to a hydrogenation zone in order to keep the carbonyl content of the product alcohol at an acceptable level and to permit purging any $C_4$–$C_5$ hydrocarbons in the hydrogenation system.

The proper operation of the intermediate column 9 depends principally on the pressure maintained therein. In the recovery of amyl alcohols and aldehydes from $C_{10}$ hydrocarbon contaminants, column 9 may be provided with 30 plates and have maintained therein a suitable pressure such as 40 p.s.i.g. With this pressure, the temperature at the bottom of column 9 will be maintained at about 450° F., heat being supplied by reboiler 23 and the overhead temperature will be kept at 375° C.

Reflux from the overhead is returned through condenser 24 to the top of column 9.

Example

The following experimental and test procedure was used in determining how to control the operation of column 9.

A 5 gal. still pot was fitted to a fractionating column 14′ high and 1½″ in diameter. The column was packed to provide 12 to 18 theoretical plates.

The crude amyl alcohols to be tested contained more than 6 volume percent of the key hydrocarbon impurity to be separated, the key hydrocarbon impurity being an olefin having double the number of carbon atoms present in the alcohol, e.g. $C_{10}$ hydrocarbons or decenes in Oxo amyl alcohol.

The still was charged with the alcohol-hydrocarbon mixture to be tested and the distillation was carried out under a pressure and under adjusted reflux for a period sufficient to reach equilibrium. The reflux ratio was maintained at 11/1 (11 parts vol. returned per each 1 part withdrawn as same product). Lower reflux ratios can be used if more plates are provided in the column. The overhead sample product withdrawn from the column at each pressure run was analyzed and the still pot temperature was determined at each run.

It was demonstrated by the tests on Oxo amyl alcohols containing more than 6 volume percent of $C_{10}$ hydrocarbons that a relatively small amount of hydrocarbon distilled overhead with the alcohol at pressures in the range of 10 to 75 p.s.i.g. the volume percent of hydrocarbon distilled with the alcohol and other oxygenated compounds was brought to a minimum of about 3 volume percent. Thus, it was demonstrated that by use of adequate pressures, preferably in the range of 10 to 75 p.s.i.g. a satisfactory separation of the hydrocarbon contaminants is obtained.

In the runs under suitable pressure conditions the disstillation temperature was in the range of 300° to 400° F. Thus, the overhead product from column 9 which is substantially richer in alcohol relative to hydrocarbon impurity can be sent to a steam distillation for recovery of pure amyl alcohols. The overhead product of column 9 may thus be passed by line 21 into the higher pressure steam distillation column 2 for a complete removal of the hydrocarbon impurities.

Having described the invention it is claimed as follows:

1. In a process for purifying crude Oxo amyl alcohols contaminated by about 1 to 12% of $C_{10}$ hydrocarbons and a smaller amount of $C_5$ aldehyde, the improvement which comprises feeding the crude alcohols into a steam distillation zone, supplying sufficient water to said steam distillation zone to maintain water in liquid phase portions of the residual crude alcohols flowing downwardly from the feed inlet to said steam distillation zone while preventing excess water from flowing down to a bottom part of said zone where the alcohol is completely stripped of water, withdrawing the alcohol completely stripped of water from a bottom part of said steam distillation zone, taking overhead from said steam distillation zone a vapor mixture containing the hydrocarbon and aldehyde impurities with some of the alcohols and with 60 to 80 mole percent of water vapor, condensing from said overhead distillate of the steam distillation zone an alcohol and hydrocarbon-rich layer, passing said alcohol and hydrocarbon-rich layer into an intermediate part of an increased pressure fractionation zone in which a pressure of 10 to 75 lbs. per square inch gauge is maintained, distilling overhead from said pressure fractionation zone a distillate of alcohols and some of the hydrocarbons, and withdrawing from a bottom part of said pressure fractionation zone a hydrocarbon oil bottoms.

2. In a process for purifying crude Oxo amyl alcohols contaminated by $C_5$ aldehydes and $C_{10}$ hydrocarbons, the improvement which comprises distilling said crude alcohols containing above 3 volume percent of said hydrocarbons in a fractional distillation zone under a pressure of 10 to 75 p.s.i.g. to separate a distillate of the alcohol and aldehyde containing about 3 volume percent of $C_{10}$ hydrocarbons leaving the remaining $C_{10}$ hydrocarbons as bottoms, then introducing a portion of said distillate into a steam distillation zone in which a substantial amount of steam is distilled and distilling from said steam distillation zone the $C_{10}$ hydrocarbons and $C_5$ aldehydes to recover the alcohol as a bottoms product free of said impurities.

3. In a process of purifying crude $C_5$ Oxo alcohol present in a hydrocarbon-rich mixture of $C_{10}$ hydrocarbon and $C_5$ aldehyde contaminants containing above 3 volume percent of said $C_{10}$ hydrocarbon contaminants, the improvement which comprises passing said mixture into an intermediate part of a fractional distillation zone, maintaining in said fractional distillation zone a pressure in the range of 10 to 75 p.s.i.g. while distilling therefrom an overhead product of the alcohol and aldehyde containing about 3 volume percent of $C_{10}$ hydrocarbon impurities to leave a hydrocarbon bottoms, passing the overhead product into a steam distillation zone in which a substantial amount of steam is distilled, and distilling overhead from said steam distillation zone substantially all hydrocarbon and said aldehyde impurities from the alcohol to recover the alcohol as a bottoms product freed of said impurities.

4. In a process for purifying a crude $C_5$-Oxo amyl alcohol mixture having present therein $C_5$ aldehyde and $C_{10}$ hydrocarbon contaminants with said hydrocarbon contaminants comprising more than 6 vol. percent of said mixture, the improvement which comprises passing said mixture into an intermediate part of a fractional distillation zone, maintaining in said fractional distillation zone a pressure in the range of 10 to 75 p.s.i.g. while distilling therefrom an overhead product of the alcohol and aldehyde with a substantially diminished amount of the $C_{10}$ hydrocarbon impurities to leave a hydrocarbon bottoms, passing the overhead product into a steam distillation zone in which a substantial amount of steam is distilled, and distilling overhead from said steam distillation zone substantially all of said hydrocarbons and said aldehyde impurities from the alcohol to recover the alcohol as a bottoms product freed of said impurities.

5. A process for separating Oxo amyl alcohols from a mixture having present therein $C_5$ aldehyde and $C_{10}$ hydrocarbon contaminants with said hydrocarbon contaminants comprising more than 6 vol. percent of said mixture, which comprises distilling said alcohols with the aldehydes and a portion of the $C_{10}$ hydrocarbons as a distillate under a pressure of 10 to 75 p.s.i.g. to leave a remaining portion of the $C_{10}$ hydrocarbons as bottoms in a fractional distillation zone, then distilling the aldehydes and $C_{10}$ hydrocarbons with a portion of the alcohols from said overhead distillate in a second fractional distillation zone in the presence of water vapor forming 60 to 80 mole percent of vapor containing the aldehydes, $C_{10}$ hydrocarbons, and a portion of the alcohols taken overhead in said second distillation zone to leave a remaining portion of the alcohols as bottoms freed of water, of said aldehydes, and of the said $C_{10}$ hydrocarbons in said second distillation zone.

References Cited in the file of this patent

UNITED STATES PATENTS

| | | |
|---|---|---|
| 2,589,018 | Morrell et al. | Mar. 11, 1952 |
| 2,614,070 | Smith | Oct. 14, 1952 |
| 2,636,847 | Hamner et al. | Apr. 28, 1953 |

OTHER REFERENCES

Perry: "Chemical Engineers Handbook" (1950), third ed. (pp. 603, column 2, 626, column 1, 582, column 2).